Jan. 20, 1931. L. G. COPEMAN 1,789,578
ICE CREAM CABINET
Filed Oct. 14, 1926 2 Sheets-Sheet 1
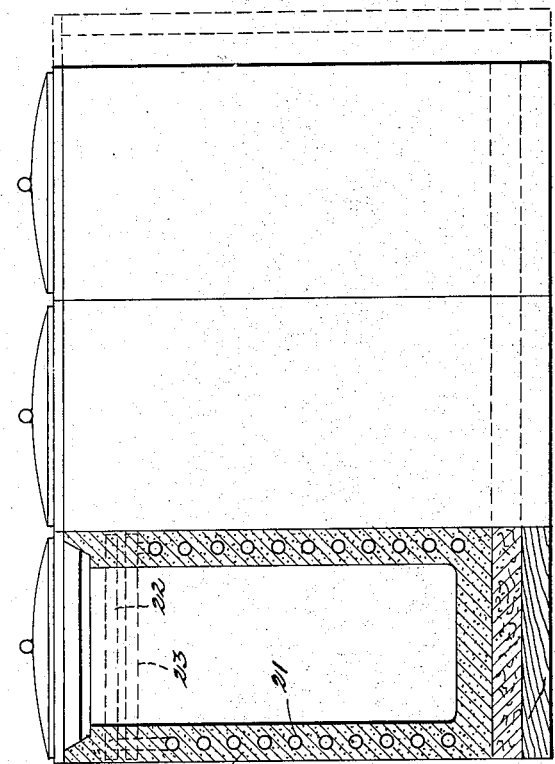
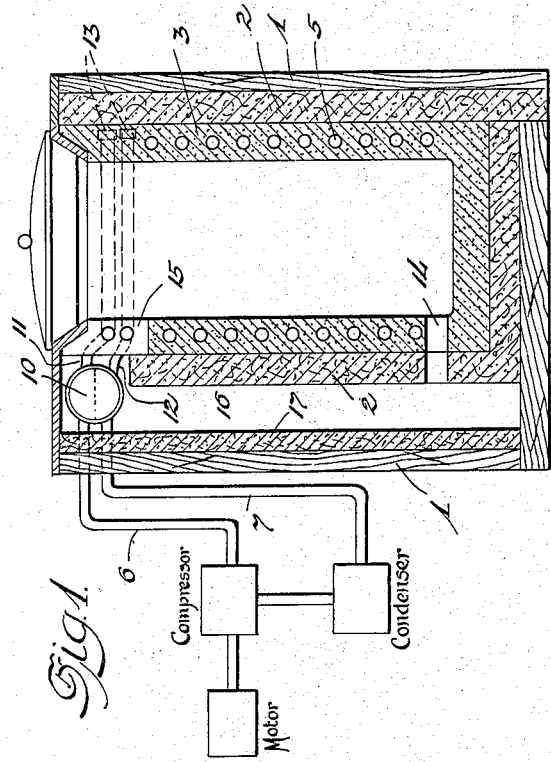
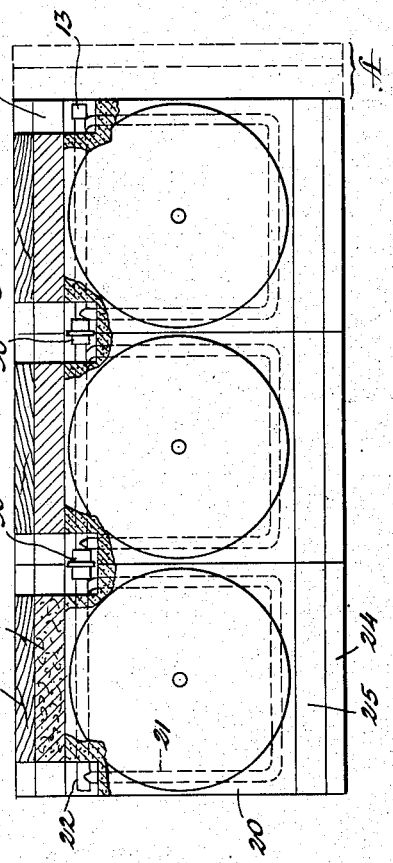
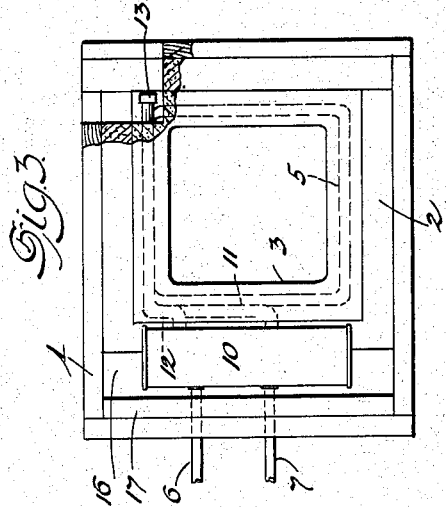
Inventor:
Lloyd G. Copeman
By Stuart E. Barnes
Attorney.

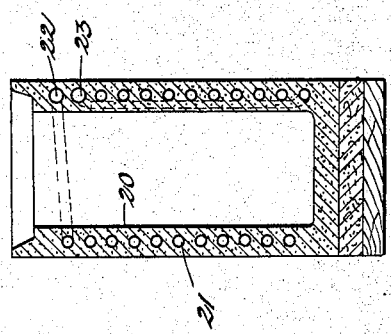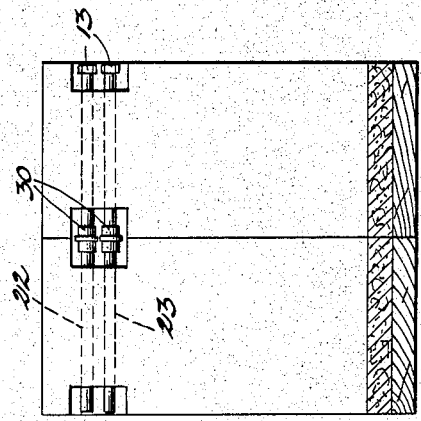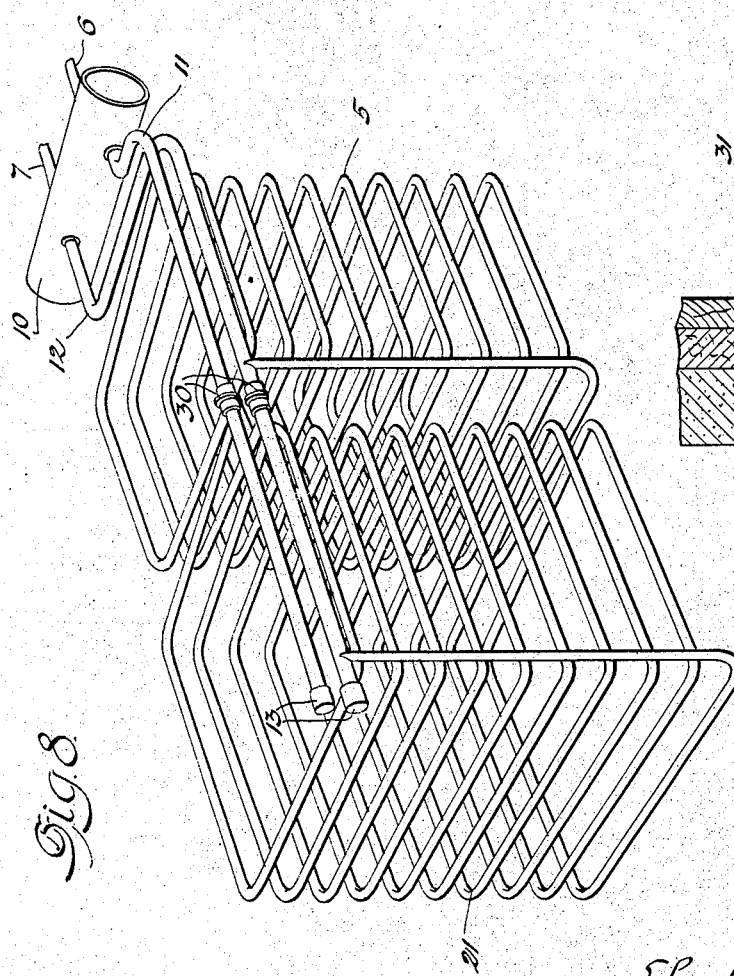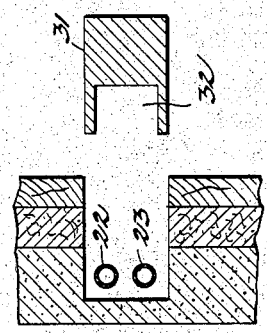

Patented Jan. 20, 1931

1,789,578

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

ICE-CREAM CABINET

Application filed October 14, 1926. Serial No. 141,464.

This invention has to do with cabinets, such as are used in commercial houses for receiving and holding ice cream containers and the like, and it has to do more particularly with such cabinets which are cooled by a power refrigerating apparatus.

Manufacturers of such cabinets have been confronted with a serious problem in meeting the demands of the market as to the size and capacity of the cabinets. Commercial houses having an extensive business require very large cabinets, the smaller houses must have smaller cabinets, and the many intermediate sizes of commercial houses require as many sizes in cabinets. This results in confusion in the manufacture of the cabinets and prevents the use of standardized methods and apparatus, and accordingly the cost of the cabinets is high.

The present invention aims to provide a cabinet which is composed of a number of units so as to overcome these difficulties. Accordingly, the invention contemplates a primary unit which would be the minimum size required, and other secondary units which may be connected to the primary unit. The primary unit is preferably equipped with part of a power refrigerating apparatus, and arranged to be cooled by such apparatus, whereas the secondary units are equipped only with a piping system but which is arranged so that it can be connected to the primary unit in such a way that its piping system becomes a part of the refrigerating apparatus. The secondary units can be used in any number desired, and in this manner any size or capacity of cabinet can be obtained.

The invention is diagrammatically shown in the accompanying drawings:

Fig. 1 is a sectional view through a primary unit, and showing diagrammatically how the same is connected to a power refrigerating mechanism.

Fig. 2 is a view showing three secondary units, one of which is shown in section.

Fig. 3 is a top plan view of the primary unit with parts removed and parts in section showing the arrangement of the several elements within the unit.

Fig. 4 is a plan view of the three secondary units having parts cut away in order to show the manner in which the secondary units are connected.

Fig. 5 is a sectional view of a secondary unit taken at right angles to the section of Fig. 2.

Fig. 6 is a rear view of two secondary units showing how the walls of the units are cut away to permit coupling of the units.

Fig. 7 is an enlarged detail of one way in which the walls of the units can be constructed to facilitate pipe connections between units.

Fig. 8 is a perspective indicating the piping system of the primary and a secondary unit, and showing how the two systems are connected together.

Referring particularly to Fig. 1, the primary unit is shown as consisting of a cabinet for holding a single ice cream container. The cabinet is constructed, preferably, of an outside shell 1 of wood, and an intermediate layer 2 of insulating material, such as cork, and an inner structure 3 of moulded stone. This moulded stone is preferably an oxy-chloride cement which I have disclosed in a number of my previous applications, which consists of magnesium oxide and a suitable aggregate such as ground flint or sand, mixed to the desired consistency with a quantity of magnesium chloride in solution at 26° Baumé. Embedded in this cast stone is a coil 5 for the purpose of receiving the refrigerant.

This primary unit is shown as connected by means of conduits 6 and 7 to a refrigerating mechanism including a motor, compressor and condenser. The refrigerating mechanism shown is of the flooded type where a boiler is utilized in which the liquid refrigerant boils. This boiler is referenced 10, and is preferably disposed within the primary unit, and leading from the boiler are pipe mains 11 and 12. These pipe mains extend across the unit and have their ends capped, as shown at 13. The coil 5 is connected to the two mains so as to receive refrigerant therefrom. The arrangement is diagrammatically shown in Fig. 8.

As the boiler 10 of this type of refrigerating apparatus extracts the heat from its surroundings as well as the coil 5, I provide the primary unit with a passageway 14, and a passageway 15 which connect the ice cream container receiving part with a chamber 16 which holds the boiler. With this arrangement one side of the primary unit has a divided wall structure with a layer of insulating material 17 enclosing the chamber 16. This provides for a circulation of air within the primary unit so that the heat absorbing qualities of the boiler 10 may be utilized.

Referring now to Figs. 2 and 4, each primary unit will be seen to include a moulded stone wall 20 having a coil 21 embedded therein. Each unit is provided with pipe mains 22 and 23 which extend across the unit and to which each coil is connected. These mains are preferably embedded in the stone, as shown in Fig. 5. The units are provided with side walls made up of a layer of wood and an interposed layer of an insulating material. However, no end walls need be provided.

In order to increase the size of the cabinet, one or more secondary units may be added to the primary unit. For this purpose the wall section A of the primary unit may be removed, and the moulded stone of a secondary unit placed against the moulded stone of the primary unit. The section A of the wall structure may then be disposed over the exposed side of the secondary unit. This is shown in dotted lines of Fig. 2.

In order that the pipe mains in the secondary unit may be connected to the pipe mains in the primary unit, the walls of each unit are cut away, as shown in Figs. 6 and 7. To connect the units together the caps 13 are removed and the mains and the two units are connected by means of pipe couplings 30. This structure leaves the pipe couplings and a portion of the mains exposed. For the purpose of covering these portions, in order to maintain the efficiency of the cooling apparatus, a block 31 is provided. This block is of a size to fit nicely within the recess formed by the two cut away portions of the units, and it is recessed as at 32 for the purpose of accommodating the pipes and unions. This block may be made up of a section of moulded stone, and an intermediate layer of cork, and an outside layer of wood, but of course, it can be made up of a block of one material if such an arrangement is found expedient. The mains 22 and 23 in the secondary unit are now closed by caps and the cabinet has been enlarged by one unit.

In supplying the primary unit to the trade, the refrigerating mechanism will be of sufficient capacity to handle the primary unit and a number of secondary units. The cabinet may be enlarged by the addition of any desired number of secondary units. The cut away portions of the walls of the primary unit, and all of the secondary units are of the same size so that the blocks 31 may be of a given size, and are fitted in between two secondary units in the same manner as between the primary unit and first secondary unit.

As indicated at 35 (Fig. 4) the last, or end secondary unit, is of substantially one-half the size of any intermediate recess formed by two adjacent units. For the purpose of closing this recess a smaller block may be used, but this block will otherwise be constructed in accordance with the block shown in Fig. 7.

For the purpose of convenient illustration the invention has been shown and described as including a primary unit having but a single containing chamber. This would be the smallest primary unit, but of course if it is found expedient, a primary unit having two or more containers could be made. To this larger primary unit as many secondary units could be added as desired.

The invention has been described and shown in connection with a refrigerating apparatus of the flooded type wherein a boiler and coils contain liquid refrigerant which boils and absorbs heat. However, the invention is equally well adapted for use with other types of refrigerating apparatus, as for instance, the type where a limited amount of liquid refrigerant enters the coils and expands to a gaseous state therein. It will be understood that in the use of ice cream cabinets of this character parts of the refrigerating mechanism such as the motor, condenser and the like, are located at a remote point, as for instance, in the basement, and the conduits 6 and 7 connect the same with the cabinet which is located in a place which is handy for the purpose.

The invention is beneficial for the manufacture of such devices and for the purchaser and user. The primary unit and secondary units can be made under standardized manufacturing conditions with the use of standardized methods and apparatus. The purchaser is enabled to specify and obtain a cabinet of any particular size, and yet the cost to him will not be increased by reason of his particular specifications since the manufacturer is enabled to produce the cabinet in standardized units. Moreover, when a user of such a cabinet finds it necessary to have a larger one, as for instance by reason of increase of business, it is only necessary to purchase one or two secondary units and connect them to his present equipment.

I claim:

1. A cabinet for holding ice cream or the like, of the type which is cooled by a power refrigerating mechanism, comprising a primary unit having a refrigerant coil connected to the refrigerating mechanism for cooling the same, a secondary unit having a coil operatively connected to the primary unit coil, this secondary unit being arranged to be disconnected from the primary unit, and a removable wall section for the cabinet which may be removed when the two units are disconnected and then placed over the end of the remaining unit to form an end wall of the cabinet.

2. A cabinet for holding ice cream or the like, of the type which is cooled by a power refrigerating mechanism, comprising a primary unit, pipe mains in this primary unit which are connected to the refrigerating mechanism, a refrigerant coil connected to the pipe mains, a secondary unit having pipe mains and a refrigerant coil connected thereto, said mains being connected together, the walls of each unit being cut away whereby access may be had to the mains for disconnecting them.

3. A cabinet for holding ice cream or the like, of the type which is cooled by a power refrigerating mechanism, comprising a primary unit, pipe mains in this primary unit which are connected to the refrigerating mechanism, a refrigerant coil connected to the pipe mains, a secondary unit having pipe mains and a refrigerant coil connected thereto, said mains being connected together, the walls of each unit being cut away whereby access may be had to the mains for disconnecting them, and means for insertion in the recess formed by the cut away portions of the walls for covering the exposed portions of the mains.

4. An ice cream cabinet, comprising the combination of a plurality of cabinet sections each constructed independently of the others and each provided for receiving a container for ice cream or the like, said cabinet sections being adapted to be placed side by side in substantially abutting relation to form in their entirety a cabinet unit, a refrigerant coil in each cabinet section, refrigerating mechanism, and means in each section for connecting the coil in that section with the refrigerating mechanism with the said coils connected in parallel, said means being disconnectable to permit of removing or adding a section whereby the capacity of the cabinet in its entirety may be varied as desired.

5. An ice cream cabinet, comprising the combination of a plurality of cabinet sections each constructed independently of the others and each provided for receiving a container for ice cream or the like, said cabinet sections being adapted to be placed side by side in substantially abutting relation to form in their entirety a cabinet unit, a refrigerant coil in each cabinet section, refrigerating mechanism, pipe mains in each cabinet section which are connected to the coil in that section, the pipe mains in each section being connected to the refrigerating mechanism in parallel whereby each section may operate independently of other sections, and means for detachably connecting the pipe mains of the several sections together which permits of attachment or detachment of a section whereby the size of the cabinet in its entirety may be varied, and means for permitting access to the pipe main connecting means.

In testimony whereof I affix my signature.

LLOYD G. COPEMAN.